Figure 1:
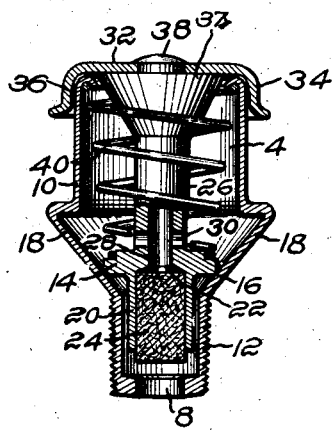

Aug. 16, 1927.

C. LEA 1,638,941

LUBRICATOR

Filed Oct. 17, 1921

Inventor:
Charles Lea,
by Emery, Booth, Janney - Varney
Attys.

Patented Aug. 16, 1927.

1,638,941

UNITED STATES PATENT OFFICE.

CHARLES LEA, OF BOSTON, MASSACHUSETTS, ASSIGNOR, BY MESNE ASSIGNMENTS, TO FREDERICK C. BLANCHARD, OF DORCHESTER, MASSACHUSETTS.

LUBRICATOR.

Application filed October 17, 1921. Serial No. 508,124.

My invention aims to provide a novel and improved apparatus for furnishing lubricant to automobile parts and other machinery. My invention will be best understood by reference to the following description, when taken in connection with the accompanying drawings of one specific embodiment thereof, while its scope will be more particularly pointed out in the appended claims.

Figure 2:
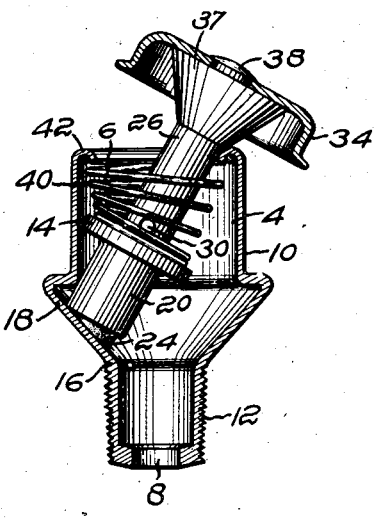

In the drawings:

Fig. 1 is a central, vertical sectional view of a lubricator exemplifying the invention, showing the said lubricator in its normal closed position; and Fig. 2 is a similar sectional view, showing the said lubricator open for filling.

Referring to the drawings, and to the embodiment of the invention which is selected for exemplification, there is shown a lubricator comprising a reservoir 4, having an inlet 6 and an outlet 8, the latter to be connected with the bearing to be lubricated. In the present example, the reservoir is formed as a part of a casing 10, conveniently stamped or drawn from sheet metal and presenting at its lower end a threaded nipple 12, surrounding the outlet 8, which may be screwed into an opening leading to the bearing.

To insure an ample supply of lubricant between the bearing surfaces and to carry away foreign substances, provision is made for initial flooding of the bearing followed by a relatively slow feeding of oil thereto. To this end, in the embodiment, the outlet is normally closed by a valve 14, which cooperates with a suitable valve seat 16, herein presented by an inclined wall 18 having a frusto-conical form, which guides the valve toward its normal central position as it closes. The valve is normally seated and prevents free escape of oil therethrough, but when lifted to some such position as that illustrated in Fig. 2 permits a flooding of the bearing. On the other hand, when the valve is closed, a slow feeding of oil to the bearing is permitted by the provision of a suitable permeable barrier. To this end, the valve is herein provided with a depending stem 20, presenting a chamber 22, which receives a plug 24 of porous felt or other appropriate construction, preferably forced into place and held there by friction so that it may be readily removed and replaced by another. The proportions and density of the felt plug are selected to suit the particular conditions under which the oil cup is used, and if the rate of feed is not correct, the plug may be removed and a different one substituted. Admission of oil from the reservoir to the chamber containing the plug herein is permitted by the provision of an upstanding stem 26, having an axial passage 28 and one or more, herein a plurality of radial passages 30.

The inlet of the reservior is shown normally closed and protected against the entrance of foreign matter by a suitable cover, herein a cap 32, conveniently formed of sheet metal and having a depending flange 34 normally disposed about the upper portion of the reservoir. Admission of air to the reservoir to facilitate the escape of lubricant therefrom may be accomplished by an air admission opening, such as a clearance space 36 between the cap and the body of the casing. If the air admission opening is employed in installations where the reservoir is subject to agitation, as in a motor car, it may be desirable to provide suitable means tending to prevent oil from slopping out through the opening, as by providing the stem 26 with a tapered or frustro-conical formation 37, which serves as baffle to return toward the bottom of the reservoir oil which slops upward about the valve stem. This formation serves another useful purpose, namely that of cooperating with the other frusto-conical formation 18 to guide the cover and valve back to their normal position under the influence of the spring. (See Fig. 2.)

Preferably, the operations of the cover and valve are coordinated, and suitable means provided yieldingly to resist opening of the cover and valve and to restore them to their closed positions after being opened. Herein the cover and valve are connected by the stem 26, which is prolonged in an upward direction and attached to the cover as by riveting at 38. A helically coiled compression spring 40 encircling the stem is seated at its upper end against a suitable abutment 42, herein an inturned and downwardly directed flange on the body of the casing, while the lower end of the spring is seated against an abutment presented by the valve. The inturned flange also serves as a baffle tending to return toward the bottom of the reservoir oil which slops upward along the sides of the reservoir. The spring shown is preferred because it serves as a positive stop to limit outward movement of the cap and valve, owing to the fact that the convolutions will abut against one another. Removal of the cover and valve is impossible without first releasing the upper end of the spring from beneath the flange 42.

To operate the device (see Fig. 1), the cover is lifted to some such position as that represented in Fig. 2, and lubricant is supplied to the reservoir. It follows that at first the lubricant will run freely through the outlet to the bearing, thus flooding the latter. When the bearing has taken up all the oil it can hold, as the supply of lubricant into the reservoir continues, the level will rise toward the top of the reservoir. The supply of lubricant should be discontinued when the reservoir is nearly or quite filled, after which the cover should be released and the cover and valve allowed to close under the influence of the spring. The working part which is thus lubricated can be started with the assurance of an ample supply of oil. Subsequently during the operation, a slow feeding of oil takes place by way of the normal feeding device, herein by seepage through the felt plug, the density and proportions of which are such as to permit the proper rate of feeding to suit the particular circumstances.

Having thus described one embodiment of the invention, but without limiting myself thereto, what I claim and desire by Letters Patent to secure is:

1. A lubricating device having a reservoir, an inlet for the introduction of oil into said reservoir, an outlet for the escape of oil from said reservoir to the part to be lubricated, means presenting a passage affording a rapid feeding communication between said reservoir and said outlet, permeable means normally restricting said passage and permitting a normal slow feeding of oil from said reservoir to said outlet, and a spring above said permeable means normally maintaining said permeable means in a slow feeding position but adapted to yield and permit rapid feeding.

2. A lubricating device having a reservoir, an inlet for the introduction of oil into said reservoir, an outlet for the escape of oil from said reservoir to the part to be lubricated, a cover for said inlet, a valve for said outlet, presenting a passage affording communication between said reservoir and said outlet, and a connection between and rigidly attached to said cover and said valve to cause movement of one to be accompanied by like movement of the other.

3. An oil cup having an inlet for the introduction of oil and an outlet adapted to be connected to the bearing to be lubricated; a liftable cover; a central stem rigidly attached to and depending from said cover into the cup and provided adjacent its lower end with a lateral enlargement adapted normally to engage a seat within the cup, said stem presenting a central opening extending from a point below said enlargement to a point thereabove, where it has one or more lateral openings; a permeable barrier in said opening below said lateral opening or openings; and resilient means connected to said stem within said cup and normally seating said enlargement on said seat.

4. In an oil cup, the combination of a valve, a casing presenting a filling opening, a seat for said valve and a tapered formation to guide said valve toward said seat, a cover for said opening, and means carried by said cover and cooperating with said casing to guide said cover toward a central position.

5. In an oil cup, the combination of a casing presenting a filling opening and an outlet, a laterally and upwardly displaceable cover for opening and a laterally and upwardly displaceable valve normally closing said outlet, a connection between said cover and said valve to cause lateral displacement of one in one direction to be accompanied by lateral displacement of the other in the opposite direction, and means within said casing to guide said cover and valve toward a central position when closing.

6. In an oil cup, the combination of a casing presenting a filling opening and an outlet, a cover for said opening and a valve normally closing said outlet, means connecting said cover and said valve to cause lateral displacement of one in one direction to be accompanied by lateral displacement of the other in the opposite direction, resilient means tending to move said cover and valve toward their normal positions, and means within said casing to guide said cover and valve toward a central position when closing under the influence of said resilient means.

7. In an oil cup, the combination of a casing and a cover presenting between them a constantly open air inlet opening and baffle means to direct toward the bottom of said casing oil slopping in an upward direction toward said opening.

8. In an oil cup, the combination of a reservoir having a filling opening and a cover for said opening, a portion of said opening serving as an air vent, and cooperating baffles, one presented by said casing and the other carried by said cover to direct oil away from said inlet.

9. In an oil cup, the combination of a reservoir having a filling opening and a cover for said opening, a portion of said opening serving as an air vent, and cooperating baffles, one an inwardly and downwardly directed flange presented by said casing and the other an outwardly facing part carried by said cover to direct oil away from said outlet.

10. A lubricating device having a reservoir, an inlet for the introduction of oil into said reservoir, an outlet for the escape of oil from said reservoir to the part to be lubricated, a cover for said inlet, normally operative slow feeding means presenting a restricted passage affording communication between said reservoir and said outlet, and a spring within said reservoir below said cover and above said slow feeding means normally to maintain said cover closed and said slow feeding means in its slow feeding condition, but adapted to yield to permit opening of said cover and to permit said slow feeding condition to be superseded by a rapid flow of oil from said reservoir to said outlet.

11. A lubricating device having a reservoir, an inlet for the introduction of oil into said reservoir, an outlet for the escape of oil from said reservoir to the part to be lubricated, a cover for said inlet, a valve for said outlet, presenting a passage between said reservoir and said outlet, a stem connecting said valve and said cover, and a spring intermediate said cover and said valve to close both, said spring being disposed laterally of said stem.

In testimony whereof, I have signed my name to this specification.

CHARLES LEA.